United States Patent [19]
Holley, Jr. et al.

[11] Patent Number: 5,275,298
[45] Date of Patent: Jan. 4, 1994

[54] SUBSTANCE CONTAINMENT APPARATUS

[76] Inventors: James W. Holley, Jr., 25236 217th Pl. SE., Maple Valley, Wash. 98038; Kirk B. Kajita, 7323 Bowlyn Pl. So., Seattle, Wash. 98118

[21] Appl. No.: 999,174

[22] Filed: Dec. 23, 1992

Related U.S. Application Data

[63] Continuation of Ser. No. 804,883, Dec. 6, 1991, abandoned.

[51] Int. Cl.$^5$ ............................................. A61J 9/00
[52] U.S. Cl. .................................. 215/11.4; 215/11.1; 215/11.5; 206/221; 220/253; 222/554
[58] Field of Search ............... 215/11.1, 68, 11.4, 215/11.5; 206/221, 219; 604/416; 251/315; 141/319–; 220/253

[56] References Cited

U.S. PATENT DOCUMENTS

| | | |
|---|---|---|
| 1,333,051 | 3/1920 | Young . |
| 1,691,811 | 11/1928 | Johnson .................. 222/554 |
| 1,701,433 | 2/1929 | Witt ........................ 222/554 |
| 1,747,550 | 2/1930 | Klimburg ................ 222/554 |
| 2,133,411 | 10/1938 | Zohe . |
| 2,197,672 | 4/1960 | Winters ................... 222/554 |
| 2,448,569 | 9/1948 | Allen . |
| 2,629,508 | 2/1953 | Prager . |
| 2,793,776 | 5/1957 | Lipari .................. 215/11.1 X |
| 2,807,384 | 9/1957 | Lipari .................... 215/11.1 |
| 2,813,649 | 11/1957 | Lipari .................... 215/11.1 |
| 2,885,104 | 5/1959 | Greenspan ........... 215/11.1 X |
| 2,931,731 | 4/1960 | Pohjola ................ 215/11.1 X |
| 3,198,477 | 8/1965 | Allenbaugh, Jr. ..... 251/315 X |
| 3,762,540 | 10/1973 | Baumann et al. . |
| 4,175,658 | 11/1979 | Moser et al. ............ 206/221 |
| 4,863,454 | 9/1989 | LaBove .................. 604/416 |

FOREIGN PATENT DOCUMENTS 2124361 11/1972 Fed. Rep. of Germany ...... 220/253

*Primary Examiner*—Allan N. Shoap
*Assistant Examiner*—Paul A. Schwarz
*Attorney, Agent, or Firm*—Patrick T. Bever

[57] ABSTRACT

A storage container for storing powdered baby formula consisting of a first opening mated with a baby bottle and a hollow member rotatably disposed in the container. A wall of the hollow member provides a waterproof seal between the interior of the hollow member and the baby bottle when the hollow member is rotated into a first position. The hollow member defines a second opening which aligns with the first opening when the hollow member is rotated into a second position. The container also has a second open end for mating to a nipple. The container is used to store a pre-measured amount of powdered formula and the baby bottle is used to store a pre-measured amount of water. When in the first position the wall of the hollow member prevents contact between the powdered formula and the water. At a desired time, the hollow member is rotated to the second position to allow the water and powdered formula to mix, thereby producing liquid baby formula. Once thoroughly mixed, the liquid formula is consumed through the nipple.

12 Claims, 5 Drawing Sheets

SUBSTANCE CONTAINMENT APPARATUS

This application is continuation of application Ser. No. 07,804,883, filed Dec. 6, 1991, now abandoned.

BACKGROUND OF THE INVENTION

1. Field of the Invention

The present invention relates to a storage container for use with a baby bottle.

2. Description of the Prior Art

A prior art baby bottle used to dispense liquid baby formula or milk is shown in FIG. 1. The baby bottle includes a bottle portion 10, having an outer wall 11 and defining an open neck 12, and a nipple assembly 15. The nipple assembly 15 includes a base 16 and a nipple 17. Generally, the nipple assembly 15 is connected to the bottle portion 10 by means of a mating threads 8 and 18 which are located on the neck 12 and the base 16, respectively. A water-tight seal is formed by pinching a portion of the nipple 17 between the base 16 and the neck 12 when the nipple portion is screwed onto the bottle portion.

Powdered baby formula is mixed with water to produce a milk-type liquid formula for consumption by infants. The powdered formula may be stored for extended periods without refrigeration. However, once the powdered formula is mixed with water to produce a liquid formula, the liquid formula must either be refrigerated or consumed within a short period of time; otherwise the liquid formula spoils.

Powdered baby formula and water are typically mixed using prior art baby bottles by combining predetermined amounts of powdered formula and water in the bottle portion 10, attaching the nipple portion 15, and shaking the baby bottle to thoroughly mix the powder with the water. This mixing process may be safely and accurately performed with the aid of suitable measuring devices and substantially sterile surroundings. In addition, where refrigeration is also available, it is possible to store mixed liquid formula for later use.

However, where refrigeration is unavailable, it is necessary to perform the mixing process immediately prior to consumption. On these occasions, if suitable measuring devices and substantially sterile surroundings are unavailable, the process becomes laborious and contamination, spillage and the production of incorrectly mixed formula can occur.

SUMMARY OF THE INVENTION

To overcome the stated limitations of the prior art baby bottles, the present application discloses a container for storing a pre-measured quantity of powdered baby formula according to the present invention. The container is used in conjunction with a baby bottle containing a pre-measured quantity of water. The container includes a removable or adjustable seal disposed between the powdered formula and the water. At a desired time, the seal may be removed or adjusted to expose the baby formula and water to produce liquid baby formula. The container in accordance with the present invention provides sterile and convenient means for mixing and storing pre-measured quantities of powdered baby formula and water, thereby avoiding the possibility of spillage, contamination and the production of incorrectly mixed formula which can occur with prior art baby bottles.

A container in accordance with the present invention includes an upper casing, a lower casing, a locking ring and an adjustable ball seal. The upper casing includes a neck to which a nipple assembly is connected, a lower surface, a shoulder and a semi-spherical interior surface into which is formed a cam groove. The lower casing includes a seat to which is connected a baby bottle, an upper surface, connecting threads and a semi-spherical interior surface into which is formed a seat. A locking ring forces the lower surface of the upper casing to the upper surface of the lower casing. The ball seal is disposed within the interiors of the upper and lower casings and includes a cam follower, a pin, a sealing surface, and defines an opening. When the locking ring is loosened, rotation of the upper casing causes the ball seal to rotate about the pin, as guided by the cam follower as it travels along the cam groove. The rotation of the ball seal results in the displacement of the sealing surface, thereby exposing the interior of the container to the interior of the baby bottle.

A method for storing and mixing powdered baby formula according to the present invention includes placing a predetermined amount of powdered baby formula into a first container, placing a predetermined quantity of water into a second container, covering a first opening of the first container or a second opening of the second container with a removable or adjustable seal, connecting the first container to the second container such that the first and second openings are separated only by the removable or adjustable seal, and removing or adjusting the seal such that the powdered formula and water are mixed through the first and second openings.

BRIEF DESCRIPTION OF THE DRAWINGS

The display device of the present invention as described in detail below will be best understood by reference to the drawings in which:

FIGS. 4c–4e are partial side views illustrating the operation of the container;

DESCRIPTION OF THE PREFERRED EMBODIMENT

Figure 1:
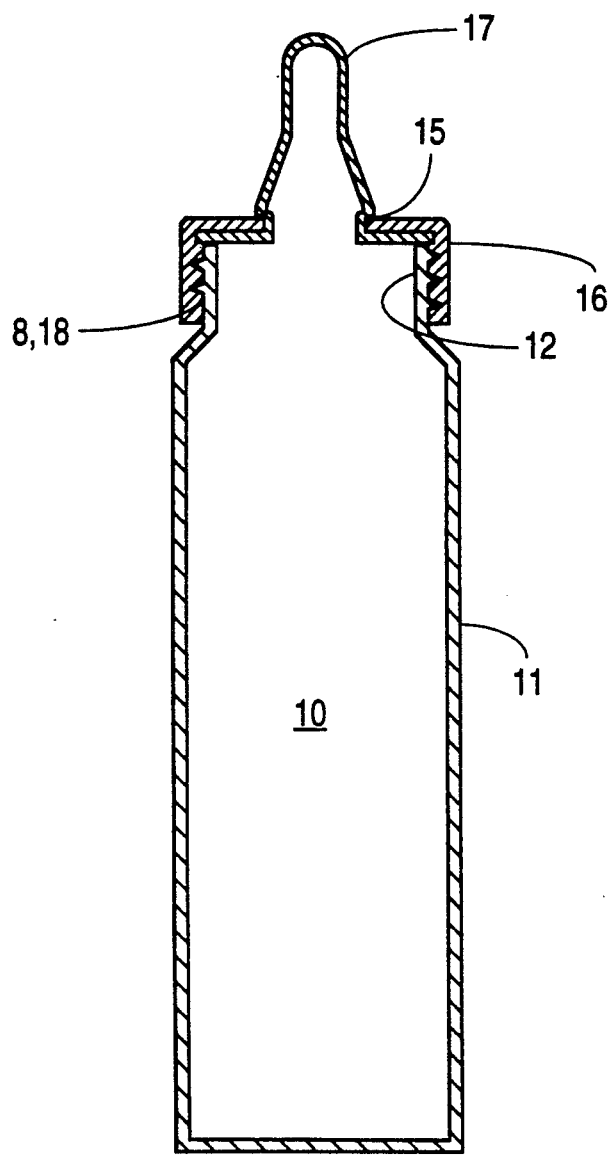
FIG. 1 is a section view of a prior art baby bottle.
Figure 2:
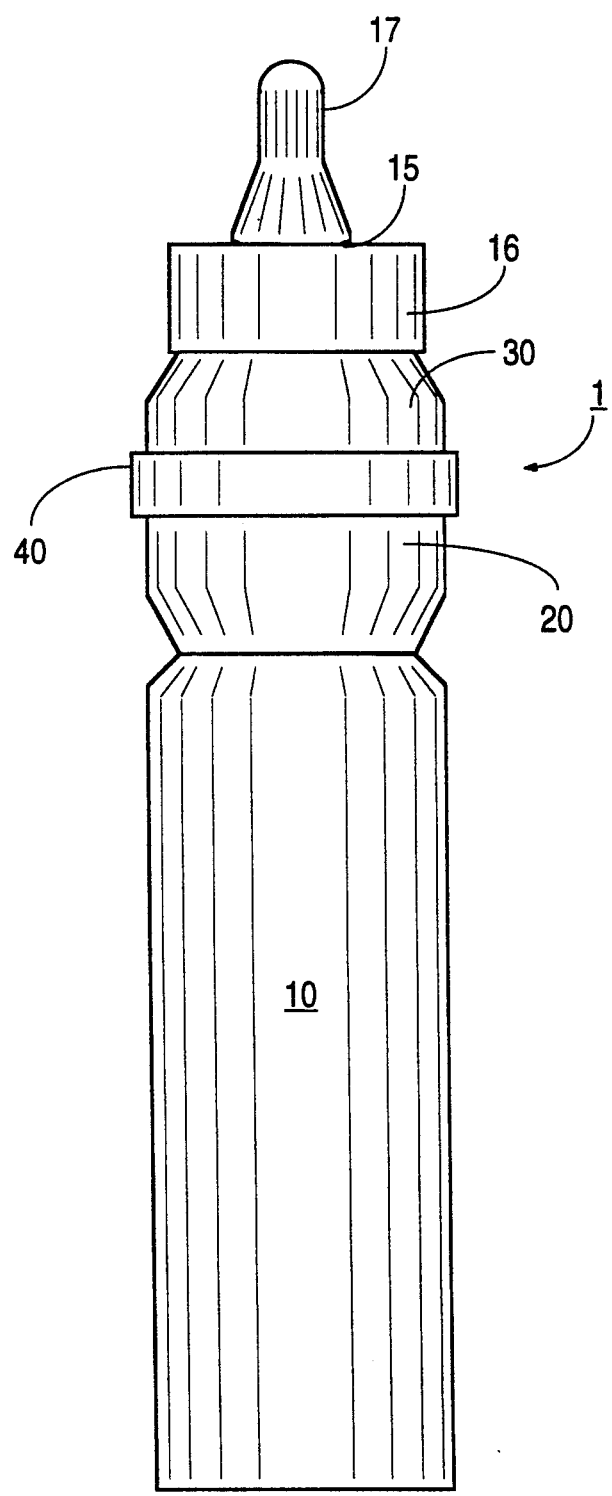
FIG. 2 is a side view of a baby bottle connected to a powdered formula container in accordance with a preferred embodiment of the present invention.
Figure 3:
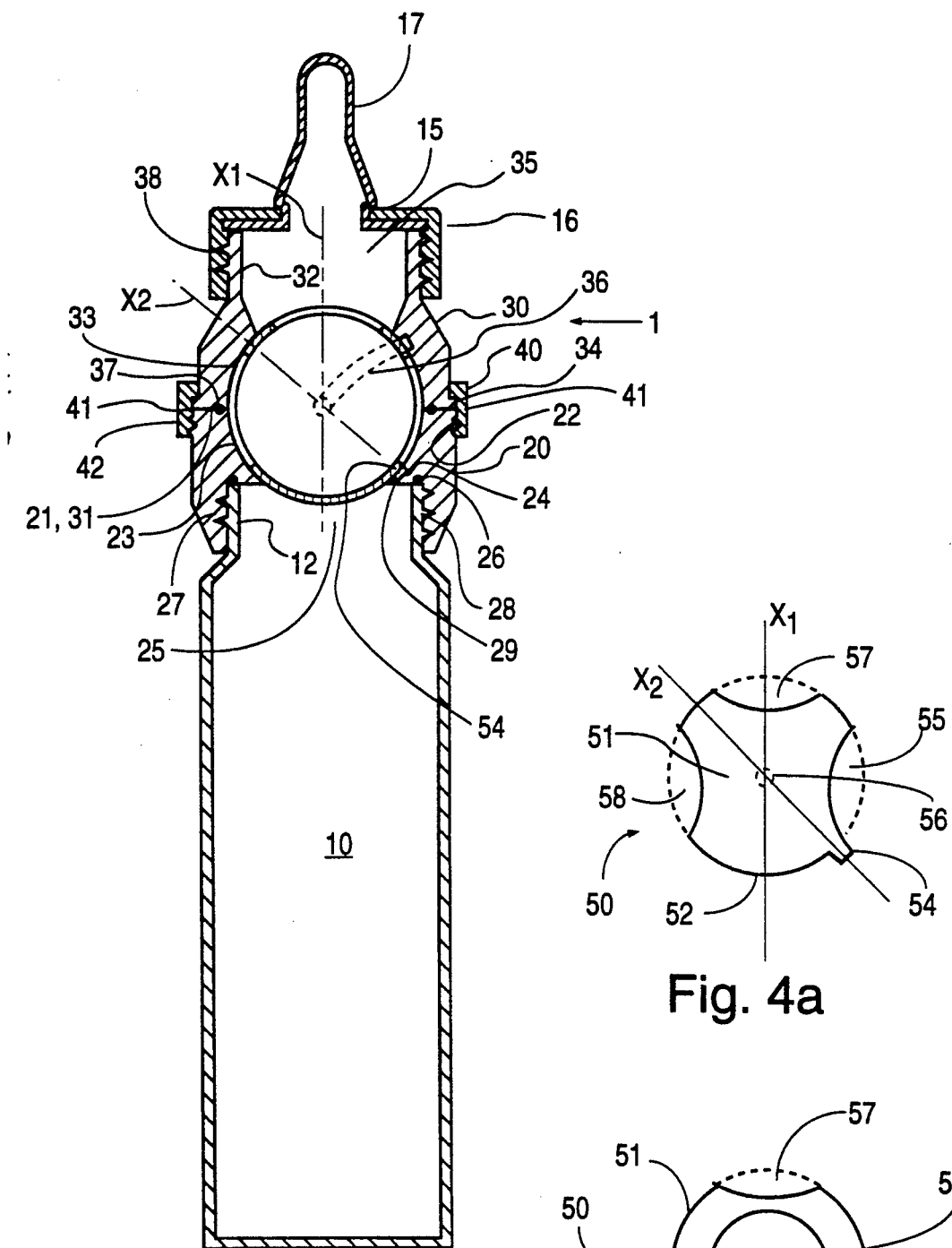
FIG. 3 is a section view of the baby bottle and powdered formula container shown in FIG. 2.

As shown in FIGS. 2 and 3, a container portion 1 in accordance with the present invention is connected between the bottle portion 10 and the nipple portion 15. The container portion 1 is made up of a lower casing 20, an upper casing 30, a locking ring 40 and ball seal (hollow member) 50. All parts of the container 1 are preferably made of plastic or rubber.

The lower casing 20 includes an upper (first) surface 21 and upper threads 22. The upper surface 21 and upper threads 22 are used to connect the lower casing 20 to the upper casing 30, as described below. The lower casing 20 also includes a depending portion 27 defining a lower (first) opening 25 and into which is formed a shelf 29 and lower threads 28. The lower threads 28 and the shelf 29 are disposed to mate with the neck 12 of a baby bottle 10 such that the lower opening 25 aligns with the bottle opening defined by the neck 12. An O-ring or seal 26 may be placed between the shelf 29 and an upper surface of the neck 12 to prevent leakage of water or baby formula. The lower casing 20 also has a substantially semi-spherical (first) inner surface 23 into which is formed a depression or seat 24. The seat 24 is significant during the rotation of the ball seal 50, which is discussed below.

The upper casing 30 includes a neck 32 defining a (second) opening 35. Threads 38 are disposed on the outer surface of the neck 32 such that a nipple assembly 15 can be connected to the upper casing 30. The upper casing 30 also includes a shoulder 34 and a lower (second) surface 31 which are used to connect the upper and lower casings, as described below. The upper casing 30 also has a substantially semi-spherical inner surface 33 into which is formed a cam groove 36. The can groove 36 is significant during the rotation of the ball seal 50, which is discussed below.

The locking ring 40 includes a lip 42 and threads 41. The locking ring 40 fits over the shoulder 34 of the upper casing 30 and forces the lower surface 31 against the upper surface 21 of the lower casing 20 when the locking ring 40 is tightened. The O-ring 37 may be used to prevent leakage between the upper surface 21 and the lower surface 31.

Figure 4A:
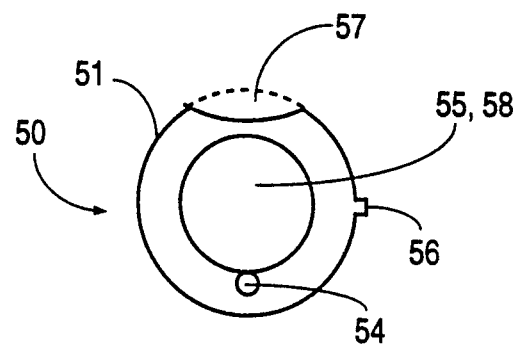
FIGS. 4a and 4b are front and side views of the ball valve.
Figure 4B:
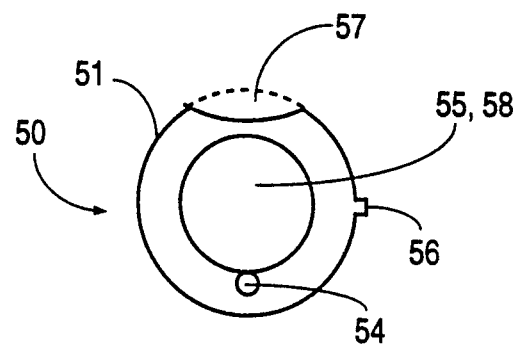

The ball seal 50, shown by itself in FIGS. 4a and 4b, is hollow and has a substantially spherical wall 51. The spherical wall 51 is toleranced such that contact between the ball seal 50 and a hollow inner portion defined by the inner surfaces of the lower casing 20 and upper casing 30 prevent rotation of the ball when the locking ring 40 is tightened. The spherical wall 51 has a sealing surface 52 and defines a lower (third) opening 55 and upper openings 57 and 58. A protuberance or pin 54 is formed on an outer surface of the ball seal 50 between the lower opening 55 and the sealing surface 52. Upon insertion of the ball seal 50 into the inner surface of the lower casing 20, the pin 54 is fitted within the seat 24. As will be described below, the pin 54 is used as a pivot around which the ball seal 50 is rotated. Also located on the outer surface of the wall 51 is a cam follower 56. When the upper casing 30 is placed over the ball seal 50, the cam follower is located within the cam groove 36. As will be described below, when the ball seal is rotated around the pin 54, the cam follower 56 is guided within the cam groove 36.

When the ball seal 50 is inserted within the lower casing 20 and upper casing 30, the pin 54 fits within the seat 24 and the cam follower 56 fits within the cam groove 36. The size of the ball seal 50 is such that when the locking ring 40 is tightened, the lower casing 20 and upper casing 30 press against the wall 51 of the ball seal 50 such that the ball seal cannot rotate. In addition, when the locking ring 40 is tightened, the force of the ball seal 50 against the inner surface 33 of the upper casing 30 prevents rotation of the upper casing 30. Conversely, when the locking ring 40 is loosened, the upper casing 30 can be rotated about the axis X1, and the ball seal 50 can be rotated about the axis X2. Note that both axes X1 and X2 lay in the plane of the paper, as shown in FIG. 3.

OPERATION

Figure 4C:
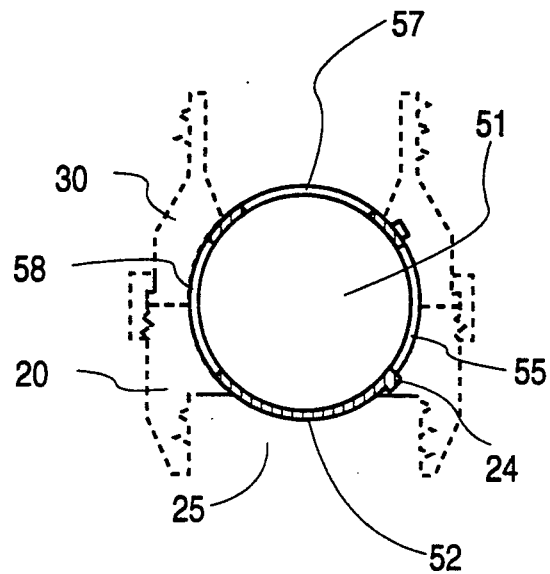
Figure 4D:
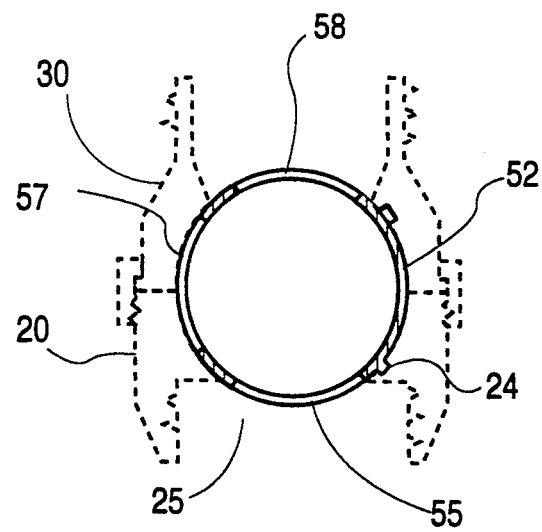

Operation of the container 1 will be explained with the aid of FIGS. 4c-4e. With the container 1 assembled as shown in FIG. 3, the locking ring 40 is loosed and the upper casing 30 is rotated counterclockwise such that the cam groove 36 exerts a force on the cam follower 56. The force on the cam follower 56 causes the ball seal 50 to rotate about the axis X2, the ball seal being held in place by the association between the pin 54 and the seat 24. When the upper casing 30 is rotated fully counterclockwise as shown in FIG. 4c, the sealing surface 52 is disposed over the bottle opening and opening into a first position 25 leading from the interior of the ball seal to the interior of the bottle 10, thereby sealing the water disposed in the bottle 10 from the interior of the container 1. The locking ring 40 is then tightened, forcing the upper casing 30 and lower casing 20 together, thereby preventing further rotation of the upper casing 30 and the ball seal 50. Powdered baby formula can then be inserted into the interior of the ball seal 50 by removing the nipple assembly 15 and pouring the powdered baby formula through a first passage formed by the opening 35 and upper opening 57 into the ball seal 50. Once filled, the upper casing 30 can be mated to a nipple assembly 15, thereby enclosing the powdered formula. In addition, a baby bottle containing a pre-measured quantity of water can be mated to the depending portion 27 of the lower casing 20.

At a desired time, the locking ring 40 is loosened to allow rotation of the upper casing 30 about the axis X1. The upper casing 30 is then rotated in a clockwise into a second position direction, thereby exerting force on the cam follower 56. FIG. 4d illustrates the ball seal 50 in a partially rotated position; note the displacement of can follower 56 along cam groove 36. As illustrated in FIG. 4e, the force on the cam follower 56 causes the ball seal 50 to rotate about the axis X2 such that the sealing surface 52 is displaced and the lower opening 55 is rotated to align with the opening 25, thereby forming a second passage into the ball seal 50 and exposing the powdered formula to the water in the bottle 10. With the ball seal 50 thus adjusted, the locking ring 40 is retightened and the container/bottle assembly may then be shaken to mix the powdered formula and water.

Figure 5:
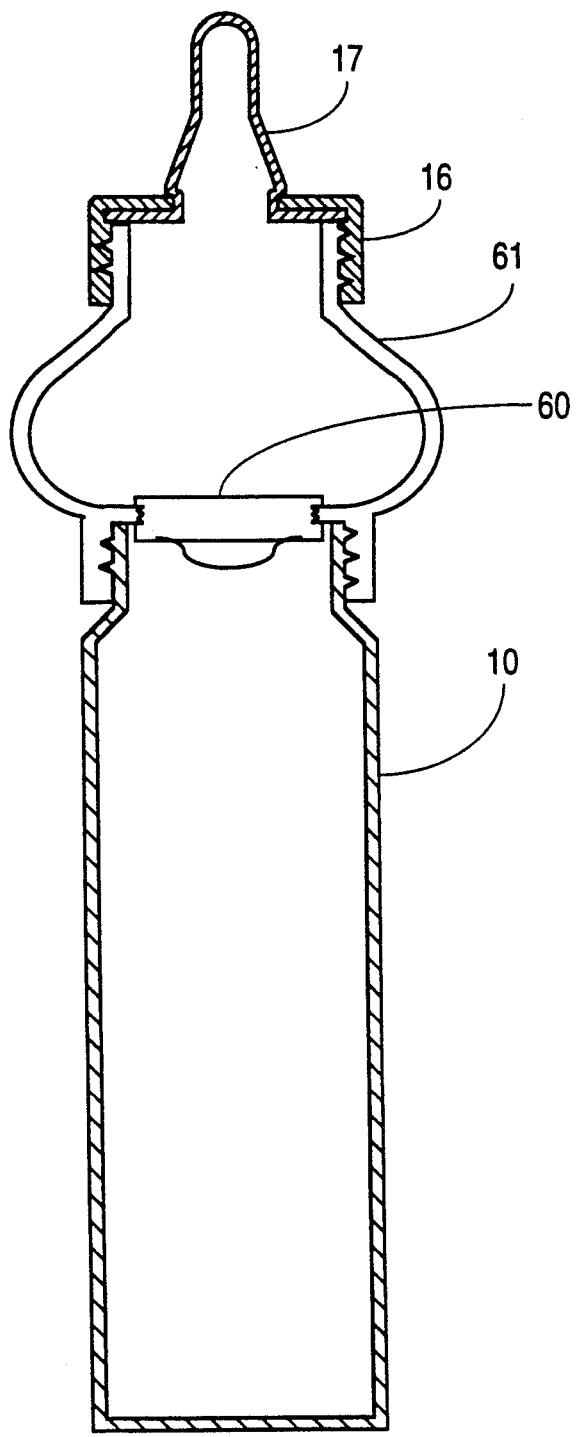
FIG. 5 is a section view showing a second embodiment in accordance with the present invention.

It would be apparent to anyone skilled in the art that several variations may be made to the container, described above, while remaining within the spirit and scope of the present invention. For instance, the ball seal 50 may be replaced with a removable seal 60, as shown in FIG. 5, such that the seal 60 can be accessed and manually removed at a desired time by detaching the container 61 from the bottle 10. In addition, the container can be integrally joined to the bottle.

We claim:

1. A substance containment apparatus comprising:
   a bottle defining a bottle opening;
   a housing connected to said bottle, said housing defining a first opening communicating with said bottle opening, said housing also defining a second opening; and
   a hollow member having an interior for storing a substance and a wall defining a third opening and a fourth opening, said hollow member being retatively disposed within the housing such that when the hollow member is in a first rotated position, said wall of the hollow member is disposed to block the bottle opening and said fourth opening aligns with said second opening wherein the substance is insertable into the interior of the hollow member through the second opening, and when the hollow member is in a second rotated position, the third opening aligns with the bottle opening to define a passage between an interior of the bottle and the interior of the hollow member.

2. The apparatus of claim 1 wherein the bottle is a baby bottle

3. The apparatus of claim 1 wherein the hollow member defines a fifth opening, and wherein when the hollow member is in the second position, the liquid passes through the fifth opening of the hollow member and out of the second opening.

4. The apparatus of claim 3 further comprising a nipple detachably connected to the housing over the second opening.

5. The apparatus of claim 1 wherein the hollow member is spherical.

6. The apparatus of claim 1 wherein said housing further comprises:
a lower casing fixedly connecting the housing to the bottle, the lower casing defining said first opening, the lower casing having a first inner surface; and
an upper casing adjustably connected to the lower casing, the upper casing defining said second opening and having a second inner surface;
wherein the first inner surface and the second inner surface define a hollow inner portion; and
wherein the hollow member is rotatively housed in the hollow inner portion.

7. A container defining a hollow inner portion, said container comprising:
a first end defining a first opening and a second end defining a second opening; and
a hollow member for storing a substance, said hollow member being rotatively disposed in said hollow inner portion and having an outer wall defining a third opening and a fourth opening;
wherein when said hollow member is in a first rotated position said outer wall is disposed to block said first opening, and said fourth opening aligns with said second opening to form a first passage into the hollow member; and
when said hollow member is in a second rotated position, said third opening aligns with said first opening to form a second passage into said hollow member.

8. The container of claim 7 wherein said first end further comprises a threaded portion disposed around said first opening for connecting to a baby bottle.

9. The container of claim 8 wherein said second end further comprises a threaded portion disposed around said second opening for connecting to a nipple assembly.

10. The container of claim 7 wherein said hollow member further comprises a fifth opening such that when said hollow member is in said second rotated position, said first, second, third and fifth openings define a passage through said hollow member.

11. A substance containment apparatus comprising:
a bottle defining a bottle opening;
a housing connected to said bottle and having a first opening communicating with said bottle opening, said housing also defining a second opening;
a hollow member having an interior for storing a substance, said hollow member having a wall defining a third opening and a fourth opening, said hollow member being rotatively disposed in the housing; and
means, connected to said hollow member, for adjusting the hollow member between a first position and a second position, wherein:
when the hollow member is in the first position, said wall of the hollow member is disposed to block the bottle opening and said fourth opening aligns with said second opening a first passage through which the substance is insertable into the hollow member, and
when the hollow member is in a second position, the third opening aligns with the bottle opening to define a second passage between the interior of the bottle and an interior of the hollow member.

12. The apparatus of claim 11 wherein said housing further comprises:
a lower casing fixedly connecting the housing to the bottle, the lower casing defining said first opening, the lower casing having a first inner surface; and
an upper casing adjustably connected to the lower casing, the upper casing defining said second opening and having a second inner surface;
wherein the first inner surface and the second inner surface define a hollow inner portion; and
wherein the hollow member is rotatively housed in the hollow inner portion.

* * * * *